United States Patent
Kent et al.

(10) Patent No.: US 11,459,255 B2
(45) Date of Patent: Oct. 4, 2022

(54) TWO-SIDED HORIZONTAL FLOW BIORETENTION STORMWATER SYSTEM

(71) Applicant: Bio Clean Environmental Services, Inc., Irving, TX (US)

(72) Inventors: Greg B. Kent, Boerne, TX (US); Zachariha J. Kent, Fair Oaks Ranch, TX (US)

(73) Assignee: Bio Clean Environmental Services, Inc., Oceanside, CA (US)

( * ) Notice: Subject to any disclaimer, the term of this patent is extended or adjusted under 35 U.S.C. 154(b) by 0 days.

(21) Appl. No.: 17/076,699

(22) Filed: Oct. 21, 2020

(65) Prior Publication Data

US 2021/0114905 A1    Apr. 22, 2021

Related U.S. Application Data

(60) Provisional application No. 62/939,634, filed on Nov. 24, 2019, provisional application No. 62/923,701, filed on Oct. 21, 2019.

(51) Int. Cl.
  *C02F 3/32*       (2006.01)
  *C02F 1/28*       (2006.01)
  *C02F 1/00*       (2006.01)
  *C02F 103/00*    (2006.01)

(52) U.S. Cl.
  CPC ........... *C02F 3/32* (2013.01); *C02F 1/004* (2013.01); *C02F 1/28* (2013.01); *C02F 2103/001* (2013.01)

(58) Field of Classification Search
  CPC .... C02F 3/32; C02F 1/28; C02F 1/004; C02F 2103/001; C02F 3/327; C02F 9/00; C02F 2003/001; C02F 2303/24; C02F 1/286; B01D 24/005; B01D 24/045; B01D 24/20; B01D 24/24; B01D 2221/12; Y02W 10/10

See application file for complete search history.

(56) References Cited

U.S. PATENT DOCUMENTS

| | | | | |
|---|---|---|---|---|
| 2008/0251448 A1* | 10/2008 | Kent | ................. | C02F 3/306 |
| | | | | 210/602 |
| 2012/0091057 A1* | 4/2012 | Kent | ................. | C02F 3/104 |
| | | | | 210/602 |
| 2013/0048557 A1* | 2/2013 | Kent | ................. | C02F 3/327 |
| | | | | 210/602 |

* cited by examiner

*Primary Examiner* — Jason M Greene
*Assistant Examiner* — Eric J McCullough
(74) *Attorney, Agent, or Firm* — Steven W. Webb (57) ABSTRACT

The embodiments of the present technology relate in general to an improved bioretention system for stormwater treatment through volume control and various filtration processes in a horizontal flow media bed. In particular, the disclosed bioretention system transfers water through the media bed horizontally and notably has two sided void area for influent runoff to pond and build up adjacent to the media bed where water is pre-treated, sediments settle on the floor area and water flows into the media bed via its vertical surface.

9 Claims, 8 Drawing Sheets

TWO-SIDED HORIZONTAL FLOW BIORETENTION STORMWATER SYSTEM

CROSS-REFERENCE TO RELATED APPLICATIONS

The present application is a non-provisional of U.S. provisional No. 62/923,701, filed Oct. 21, 2019, which is a continuation in part of U.S. patent application Ser. No. 16/417,472; which is a continuation of U.S. patent application Ser. No. 14/284,154, filed May 21, 2014 and issued as U.S. Pat. No. 10,294,135; which is a continuation of U.S. patent application Ser. No. 13/668,455, filed Nov. 5, 2012 and issued as U.S. Pat. No. 8,771,515, which is a continuation of U.S. patent application Ser. No. 13/215,077, filed Aug. 22, 2011 and issued as U.S. Pat. No. 8,303,816, all of which are hereby incorporated herein by reference in their entireties. Additionally, the subject matter of the present application is related to the following U.S. patent application Ser. No. 13/215,077 filed Aug. 22, 2011, now U.S. Pat. No. 8,303,816; and U.S. patent application Ser. No. 13/668,455 filed Nov. 5, 2012, now U.S. Pat. No. 8,771,515.

FIELD OF THE INVENTION

The embodiments of the present technology relate in general to an improved bioretention system for stormwater treatment through volume control and various filtration processes in a horizontal flow media bed. In particular, the disclosed bioretention system transfers water through the media bed horizontally and notably has two sided void area for influent runoff to pond and build up adjacent to the media bed where water is pre-treated, sediments settle on the floor area and water flows into the media bed via its vertical surface. The system also integrates a pre-filter chamber to settle out larger sediment and screen out trash, leaves, and debris.

The present invention presents a system and method for providing enhanced stormwater treatment and volume control while also reducing the needed footprint for the required amount of media surface area and thus in turn reducing the land, materials, and installation costs. The disclosed bioretention system may reduce the footprint required in a developed area such as a parking lot or other impervious, developed landsite by up to 50 percent of a footprint of systems already known in the art, meanwhile providing the same amount of media surface area required to meet state and local regulations relating to size requirements of a bioretention system. A traditional bioretention system must generally have a surface area of media that is 3% to 6% of the site area. This land offset is intended to maintain pre-developed stormwater discharge for a range of water flows which would be calculated for the given location of the development site; however, it may present a financial and sometimes logistical challenge for the construction project.

Traditional bioretention systems are downward flow configurations; therefore, the media surface area is equal to the physical footprint. In contrast, the present invention with its horizontal flow configuration allows up to twice the media surface area in comparison to its footprint, making the system space saving and helpful for developers who have limited space and also want to minimize costs.

Bioretention systems, including rain gardens, infiltration trenches, and bio swales offer an aesthetic for developed sites because they include above ground vegetation, shrubs, trees or any combination thereof. Typically, this vegetative bed is supported by a filtration media layer. Many bioretention systems implemented to date, while visually appeasing, present a variety of other challenges when it serves its original function, which is to manage stormwater management.

As mentioned, systems common in the art are designed with downward water infiltration and treatment. This leads to a number of problems including but not limited to:
1) Systems lacking a trash and debris capture chamber or catch basin which will result in trash and debris accumulation on the vegetative bed, thereby leading to decreased infiltration rates because the surface area where rain and stormwater enters the bioretention system is clogged with trash and debris.
2) Localized sediment displaced and carried to the bioretention system will similarly clog the surface area of the system, thereby reducing water infiltration.
3) Similarly, continual downward waterflow displaces the soils and exposes vegetative roots near the surface of the system. This can have a negative effect on the health and robustness of the vegetative plants. This ponding of water also causes root rot and disease.
4) The ponding water and depressed landscaping is a safety hazard. People can fall into the depressed landscape area. The ponding water also allows for mosquitos to breed which carry disease such as west Nile virus.

Conversely, the invention disclosed provides an improvement over downward infiltration bioretention systems as well as different types of systems which utilize horizontal infiltration. Some horizontal infiltration biorentention systems described in the prior art include the applications and patents incorporated herein by reference.

Bioretention systems which manage and guide water through a system horizontally offers advantages such as but not limited to:
1) An opportunity to position a pretreatment filtration device to trap sediment and larger debris and trash carried by the stormwater stream and remove it from the stormwater flow before it enters the rest of the filtration media bed. This prevents debris and trash clogging commonly experienced with downward infiltration systems. The pretreatment chamber disclosed herein may include a built-in curb screen or grate inlet, inlet pipes from upstream, drainage spouts, catch basins, or other similar devices.
2) Horizontal stormwater flow movement reduces vertical water pooling on the vegetative bed. Testing has also shown that it reduces clogging and improves maintenance longevity.
3) Filtration capacity of the system is increased without a compromise of surface space in the developed site with the inclusion of two side walls as described in this disclosure.

Independent third-party testing demonstrated three improvements of the disclosed horizontal infiltration invention versus a standard downward infiltration bioretention system. First, the average stormwater infiltration of the disclosed invention was 27% higher (21.7 in/hr versus 15.8 in/hr). Second, the volume of water treated increased by 33% (1.596 million gallons versus 1.074 million gallons). Third, the sediment load treated was 28% more (11,460 lbs. versus 8,224 lbs.).

BACKGROUND

Water treatment systems have been in existence for many years. These systems treat stormwater surface runoff or other polluted water. Stormwater surface runoff is of concern for two main reasons: one because of the effects of its volume and flow rate, and two, because of the pollution and contamination it can carry. The volume and flow rate of stormwater is important because high volumes and high flow rates can cause erosion and flooding. Pollution and contamination are important because stormwater is carried into our rivers and streams, from there into our lakes and wetlands, and furthermore because it can eventually reach our oceans. Pollution and contamination that is carried by stormwater can have adverse effects on the health and ecological balance of the environment.

The Clean Water Act of 1972 enforced by the U.S. Environmental Protection Agency (EPA) set the stage for vast improvements to a water infrastructure and quality. Water pollution has been divided into two categories: point source and non-point source. Point sources include wastewater and industrial waste. Point sources are more easily identifiable, and therefore direct measures can be taken to control them. The other category, non-point source, is more difficult to identify. Stormwater runoff is the major contributor to non-point source pollution in rivers, lakes, streams and oceans. Studies have suggested and confirmed the leading cause of pollution to our waterways is from contaminated stormwater runoff. As we build houses, buildings, parking lots, roads and other impervious areas, we increase the amount of water that runs off the land and into our stormwater drainage systems, which all lead to rivers, lakes, streams and the ocean. As more land becomes impervious, less of the rain seeps back into the ground. This leads to less groundwater recharge and higher velocity flows in streams, which cause erosion and increased loads of contaminants into these waterways.

There are some sources of pollutants that are present in stormwater runoff. Sediments come from hillsides and other natural areas that are disturbed during construction and other human activities. When land is stripped of vegetation the soil more easily erodes and finds its way to storm drains. Trash and other unnatural debris are dropped on the ground every day which finds its ways into the drainage system and ultimately our waterways. Leaves from trees and grass clippings from landscape activities that land on hardscape areas no longer decompose back into the ground but flow to our storm drains and collect in huge concentrations in lakes and streams. These organic substances leach out huge loads of nutrients and they decompose and cause large algae blooms which deplete the dissolved oxygen levels and kill fish and other organisms. Other unnatural sources of nutrients including nitrogen, phosphorus, and ammonia come from residential and agricultural fertilizers that are used in access and find their way to storm drains. Nutrients are one of the number one pollutants of concern in our nations.

Other major pollutants of concern include heavy metals which come from numerous sources and are harmful to fish and other organisms including humans. Many of our waterways are no longer safe to swim in or fish in and therefore no longer have any beneficial use. Heavy metals include but are not limited to zinc, copper, lead, mercury, cadmium and selenium. These metals come from car tires and brake pads, paints, galvanized roofs and fences, industrial activities, minim, recycling centers, any metal materials left uncovered. Other major pollutants of concern are hydrocarbons which include oils and grease. These pollutants come from leaky cars and other heavy equipment and include hydraulic fluid, break fluid, diesel, gasoline, motor oils, cooking oils and other industrial activities.

Bacteria, pesticides and organic compounds are a few other categories of pollutants which are also harmful to our waterways, wildlife and humans. Over the last 20 years the EPA has been monitoring the pollutant concentrations in most of the streams, rivers and lakes throughout the country. Over 50% of four waterways are impaired for one or more of the above-mentioned pollutants. As part of the Phase 1 and Phase 2 NPDES (National Pollutant Discharge Elimination System) permits which control industrial and non-industrial development activities the control of these sources of pollutants in now mandated. Phase 1 was initiated in 1997 and Phase 2 was initiated in 2003. While there are many requirements to these permits the three main focuses are on source control, during construction pollution control and post construction pollution control. Post construction control mandates that any new land development or redevelopment activities are required to incorporate methods and solutions that both control increased flows of rain water off the site and decrease (filter out) the concentration of pollutants off of these developed sites. These are commonly known as quantity and quality control. Another part of these requirements is for existing publicly owned developed areas to retrofit the existing drainage infrastructure with quality and quantity control methods and technologies to decrease the existing amount of rainwater runoff and pollutant concentrations.

One of the main categories of technology that help with obtaining these goals are referred to as structural best management practices or BMPs. Structural BMPs are proprietary and non-proprietary technologies that are developed to store and/or remove pollutants from stormwater. Methods such as detention ponds, detention basins, or regional wetlands are used to control the volume of runoff which provides some pollutant reduction capabilities. Over the past 10 years numerous technologies have been invented to effectively store water underground and thus freeing up buildable land above them. Various treatment technologies such as catch basin filters, hydrodynamic separators, and media filters are used to remove pollutants. These technologies commonly work by using the following unit processes: screening, separation, physical filtration, and chemical filtration.

Other technologies such as bio swales, infiltration trenches, and biorentention areas commonly known as low impact development (LID) or green infrastructure (GI) have recently been implemented in the last 10 years to both control/reduce volume discharge of stormwater and remove pollutants from stormwater. These LID technologies have proven successful at removing difficult pollutants such as bacteria, dissolved nutrients and metals as they provide not only physical and chemical, but also biological filtration processes by incorporating a living vegetation element which creates a living microbial community within the media by the plants' root systems which assist in pollutant removal. Biological filtration processes have proven to be excellent at removing many of the pollutants that physical and chemical filtration systems alone cannot. While these technologies are effective, they take up substantial amounts of space which are not always available on various construction projects. As such a need has arisen for compact LID technologies that offer the same advantages as their larger and therefor, more expensive counterparts.

Biofiltration BMPs and other LIDs offer an aesthetic benefit for developed sites because they may incorporate above ground vegetation, shrubs, trees or any combination thereof. Typically, this vegetative bed is supported by a filtration soil media layer within the underground chambers. Many biofiltration systems (bioretention, bio swales, planter boxes, wetlands) implemented to date, while visually appeasing, present a variety of challenges with loading rate consistency, minimizing clogging rates, and optimizing flow control.

Recent technological advancements in the field have focused on taking the traditional bioretention concept which is focused around vertical downward flow media filtration beds which pool water on top of the bed, making them up to a tenth of the size smaller by using high flow rate filtration media. As with traditional large bioretention systems these new compact biorentention systems accept stormwater runoff directly without pre-treatment and therefore receive large amounts of particulates that can clog the media filtration bed. This clogging has been exacerbated with these compact systems as the surface area of the media is only one-tenth that of the traditional large bioretention systems. These downward flow systems are notorious for clogging as sediments accumulate on top of the media filtration bed's surface. There is a need for a better way of constructing biofiltration systems which allows the systems to still be compact by maximizing the media surface area for a given media bed volume and to improve the stormwater flow load rate. The greater the surface area for a given volume of media, the lower the loading rate on the media, and therefore less probability of clogging. Also, the traditional downward vertical flow path as seen in much of the prior art, is most problematic for clogging, as gravity allows inflow particulates to quickly and easily accumulate on top of the media bed.

Additionally, stormwater is characterized by large concentrations of various pollutants including trash, debris and sediments. Reports have shown that for urbanized area an average of 7.6 cubic feet of trash and 2.4 cubic yards of sediment are generated per acre of impervious surface per year. In many areas, where proper erosion control measures are not taken, which is common, the loading of sediment is much higher. Therefore, a system which has a media bed designed to minimize clogging along with a pre-treatment chamber to remove trash and sediments provides huge advantages to the end user. Considering the collection of these pollutants, maintenance of stormwater BMPs can be very expensive and a burden to property owners. There is, thus a need for a system that can minimize maintenance costs.

Also, with changing stormwater regulations, a move is being made from flow based design to volume based design. Volume based design requires treatment along with volume control and reduction. Volume based design requires not only a treatment system but an upstream, storage system (above ground or underground) with an outlet control. Only horizontal flow biofilters can be placed downstream of the storage system. By having the biofilter downstream with its built in flow control riser with orifices, it not only provides treatment but also acts as a more efficient outlet control structure to optimize volume control and reduction. This eliminates the need for an additional outlet flow control structure generally constructed with any type of stormwater storage system.

Some systems include a wetlands chamber having a vegetative submerged bed, one or more walls, a floor, one or more inlet water transfer pipes and one or more outlet water transfer pipes. Examples of related systems are described in U.S. Pat. No. 7,425,262 B1, U.S. Pat. No. 7,470,362 B2 and U.S. Pat. No. 7,674,378, the contents of each of which are incorporated herein by reference in their entirety. In other systems, each of the walls and floor have an inner and outer metal mesh wall, with a space between the inner and outer walls to house stonewool filtration media slabs. Having a catch basin or chamber also includes one or more inflow pipes in one or more of the four walls to allow influent to pass into the catch basin. The system is configured so that the sediments and associated pollutants settle out of the influent and accumulate on the floor of the catch basin or chamber. A filtration panel comprising four or more walls enclosing an open space housing a filtration media bed, the walls being water permeable in structure to allow passage of water in either direction, with the filtration media bed filing the entire chamber of the filtration panel and being water permeable.

Contaminated water such as stormwater and wastewater contain high levels of particulate pollutants such as total suspended solids (TSS), metals, organics, nutrients, and hydrocarbons. These particulates cause media filtration beds to clog, which decreases their treatment flow capacity and increases the maintenance and replacement requirements of the granular media within the media filtration bed. Because of the clogging, a need has arisen which further increases the amount of initial media bed surface area for a given volume of filter media. By increasing the amount of available media bed surface area for a given volume of media the surface loading rate decreases for a given flow of water and therefore decreases the rate at which media will clog due to particulates.

Traditional downward flow media filtration beds have their initial media surface area lay horizontal, perpendicular with the force of gravity. Therefore, pollutant particles accumulate on top of the media bed and clog the media at a much faster rate and thereby decreasing the media filtration bed's flow rate and performance, along with increasing the required maintenance and decreasing the life of the media before replacement is needed.

With the ever-changing stormwater regulations, a system providing features which lowers maintenance costs, increases performance and pollutant removal, and can be integrated with storages systems, and placed downstream are in great need and demand. Furthermore, the smaller these systems are, the easier they can be integrated into urban areas with space restrictions. In other words, the easier it is made to incorporate these types of systems into urban areas, the greater overall affect we will have on reducing pollution in rivers, lakes and streams.

SUMMARY OF THE INVENTION

Embodiments described herein are directed to a horizontal flow wetland biofilter system comprising a chamber with impermeable outer walls spaced away from permeable media cages encasing biofiltration media. In preferred embodiments, the wetland biofiltration system as described includes a pre-treatment chamber with an access hatch and may also include a curbside inlet. The pre-treatment chamber may also include trash pre-filtering screens which can readily be cleaned via the access hatch. Stormwater or dry water flows may further be filtered through the above ground combination of vegetation and mulch.

Water may also enter the system via an inlet pipe or opening which may be in connection with an underground water storage container or other stormwater treatment system.

In one embodiment of the invention, a wetland biofilter chamber comprises one or more outer side walls and a floor section defining a substantially enclosed chamber; a biofiltration media bed.

The outer side walls and floor section of the wetland biofiltration system may be impermeable.

The one or more outer side walls may include an intake opening to receive an influent into the pre-treatment chamber.

The intake opening may be located on a lower half of a side wall.

The wetland biofilter chamber may further comprise a perforated underdrain running along the floor of the wetland biofilter chamber. The underdrain leads to the outlet opening and is readily maintained to remove debris which may have escaped the trash screens in the pre-treatment chamber via the underdrain cleanout risers which are accessible above ground.

The height of the inner side walls may be approximately 25% to approximately 100% of the height of the chamber walls.

The thickness of the media filtration bed may be approximately 0.25 inches to approximately 80 feet.

The thickness of the media filtration bed may be approximately 1 to approximately 4 feet.

The media filtration bed may contain one or more granular filtration media composed of organic, inert, or sorptive substances that provide physical, chemical and biological filtration of contaminated fluid.

The method may further comprise receiving the influent into the catch basin from an intake opening located on a lower half of a side wall.

The method may further comprise receiving the influent into the catch basin from an intake opening located on an upper half of a side wall.

The method may further comprise a series of chambers assembled end-to-end creating a larger wetland biofiltration system.

From this description, in conjunction with other items, the advantages of the said invention will become clear and apparent, more so based upon the hereinafter descriptions and claims, which are supported by drawings with numbers relating to parts, wherein are described in the following sections containing the relating numbers.

BRIEF DESCRIPTION OF THE DRAWINGS

The accompanying drawings, which are incorporated in and constitute a part of the specification, illustrate embodiments of the invention and, together with the description, serve to explain the objects, advantages, and principles of the invention. In the drawings.

DETAILED DESCRIPTION OF PREFERRED EMBODIMENTS

After reading this description it will become apparent to one skilled in the art how to implement the invention in various alternative embodiments and alternative applications. However, all the various embodiments of the present invention will not be described herein. It is understood that the embodiments presented here are presented by way of an example only, and not limitation. As such, this detailed description of various alternative embodiments should not be construed to limit the scope or breadth of the present invention as set forth below.

The disclosed system is encased in a pre-cast or cast in place concrete structure. The concrete structure can be installed entirely underground, flush with the site's surface level, or as a raised planter. The submerged system is designed to accommodate both pedestrian and vehicle traffic. The floor may be open so some stormwater can drain into the surrounding area or installed with a sealed floor.

The filtration media may be a combination of organic and/or inorganic materials and may include gravel, sand, and/or other rocks to increase infiltration. The filtration media bed allows for capture of smaller pollutants such as phosphorus and nitrogen.

This system presents enhanced flow rate management and may include a stormwater bypass system during high flow storms.

FIGS. 1 through 6 further illustrate preferred embodiments of the invention.

Figure 1:
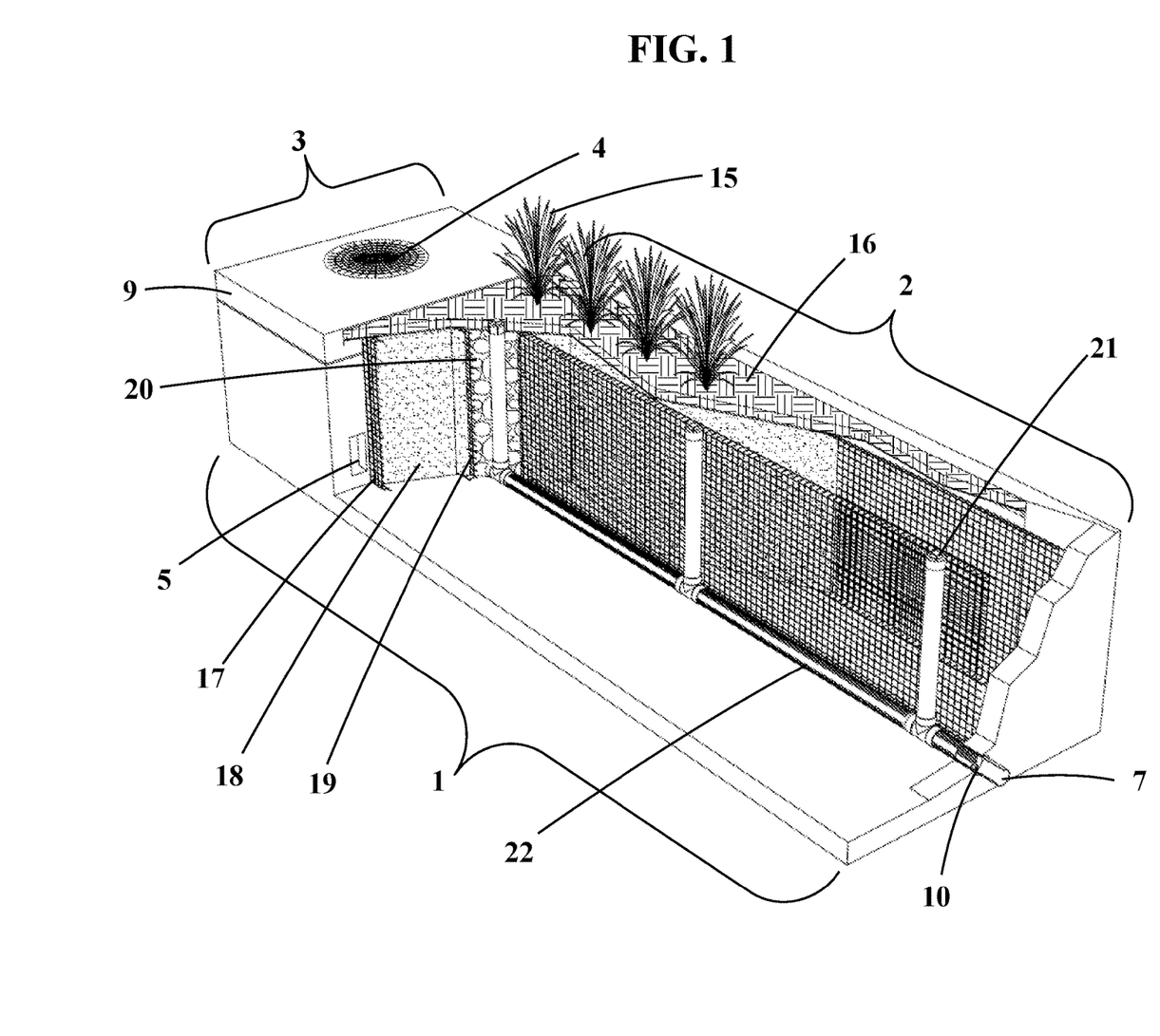
FIG. 1 is a cut-away view of an embodiment of a horizontal flow wetland biofilter system located below ground.

FIG. 1 begins to present a preferred embodiment illustrating a cut-away of a preferred embodiment of the wetland biofilter system 1 with a biofilter wetland chamber 2 and a pre-filter chamber 3 with an access hatch 4 located below ground. Attached to the pre-filter chamber 3 is a transfer opening 5 and with a biofilter media cage inlet side 17 and a biofilter media cage outlet side 19 separating the bioretention media 18 from the biofilter wetland chamber 2. Also, within the biofilter wetland chamber 2 is a perforated underdrain 22 affixed to underdrain cleanout risers 21. The perforated underdrain 22 leads to an orifice outlet control 10 and an outlet pipe/opening 7. Lastly, mulch 16 and vegetation 15 are above ground onto of the biofilter wetland chamber 2.

Figure 2:
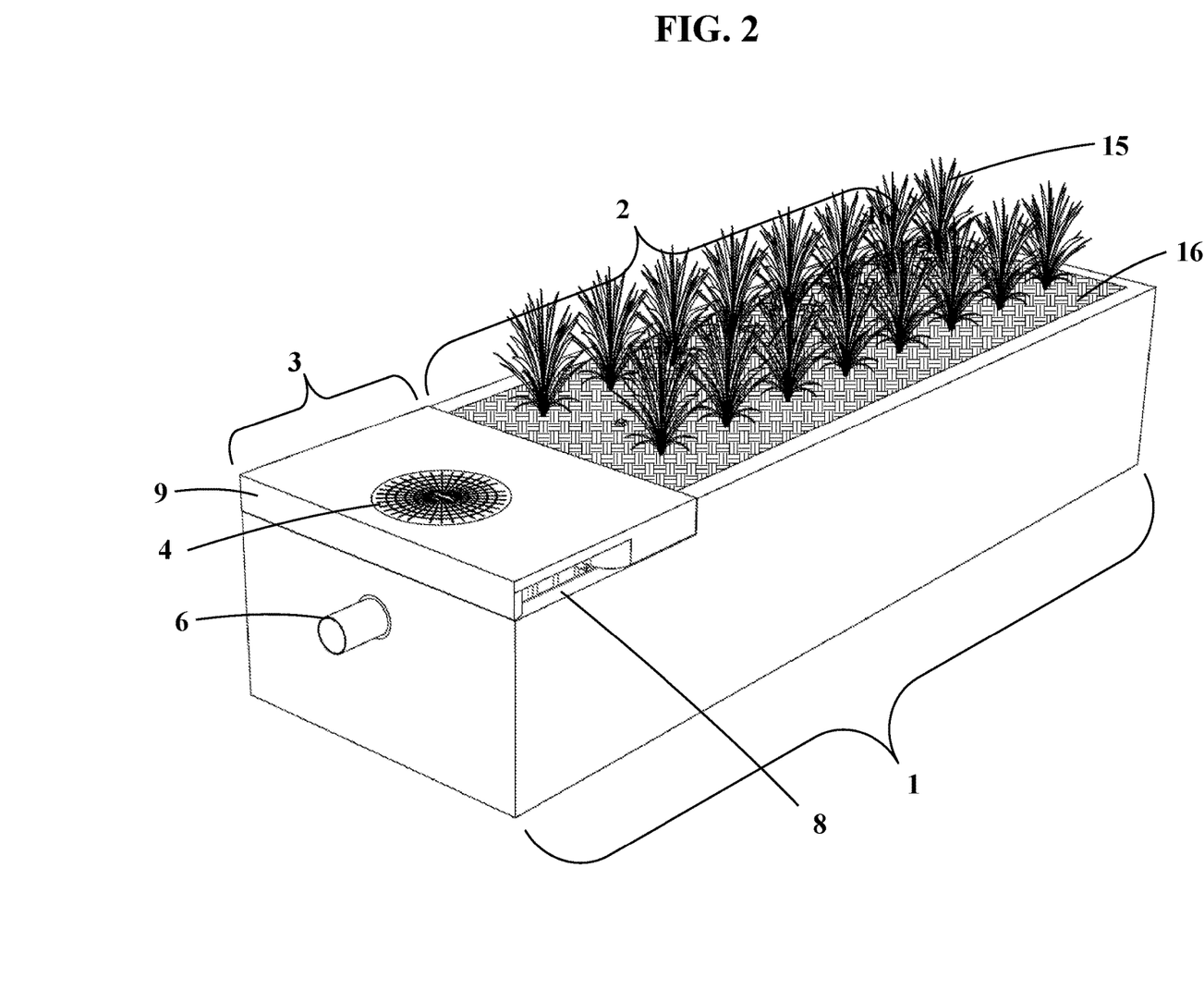
FIG. 2 is a three-dimensional view of a complete system of a preferred embodiment of the horizontal flow wetland biofilter system.

FIG. 2 presents the encapsulated, three-dimensional view of a preferred embodiment of the wetland biofilter system 1 which clearly depicts other elements of the system, including a below ground inlet pipe/opening 6 leading to the pre-filter chamber 3 with an access hatch 4 and an additional point of entry, an above ground curb inlet opening 8 within the pre-filter chamber top 9. The inlet pipe/opening 6 allows the wetland biofilter system 1 to be attached to other water storage or stormwater treatment systems (not shown). Atop the biofilter wetland chamber 2 is above ground mulch 16 and vegetation 15.

Figure 3:
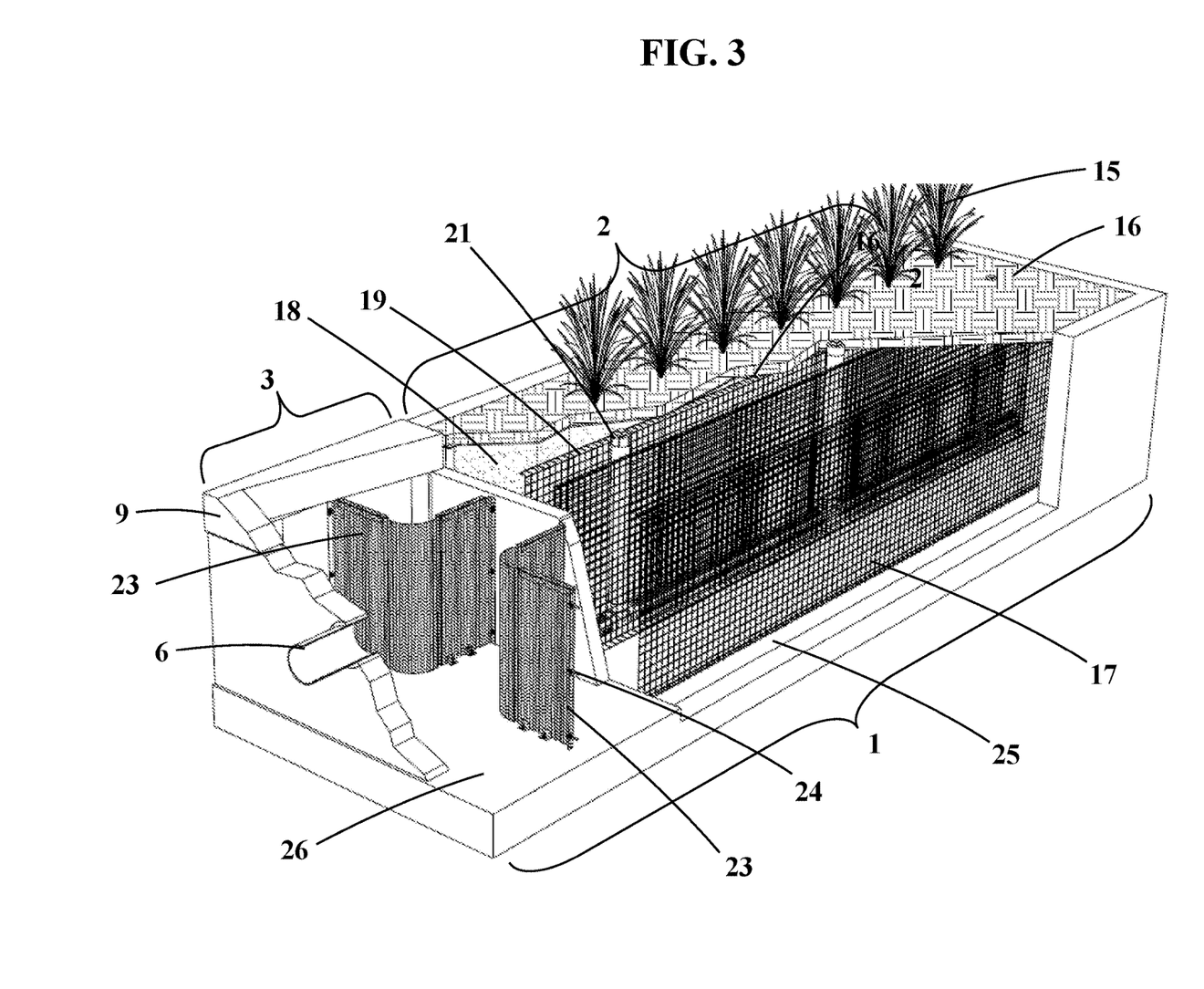
FIG. 3 is a cut-away view of an embodiment of the horizontal flow wetland biofilter system highlighting different segments of the entire system.

FIG. 3 clearly presents several sections of the wetland biofilter system 1 including trash pre-filter screens 23 within the pre-filter chamber 3 the trash pre-filter screens 23 are affixed to the pre-filter chamber 3 walls and pre-treatment chamber floor 26 with mounting hardware 24. Also shown via a cut-away view of the pre-filter chamber 3 is the inlet pipe/opening 6 and the pre-filter chamber top 9. The connected biofilter wetland chamber 2 presents mulch 16 and vegetation 15 on top. Below ground in the cut-away view of the biofilter wetland chamber 2 different separation elements segment the biofilter wetland chamber 2, including a biofilter media cage inlet side 17 and a biofilter media cage outlet side 19 encasing the bioretention media 18. The underdrain cleanout risers 21 is also present as well as a underdrain cleanout risers 21.

Figure 4:
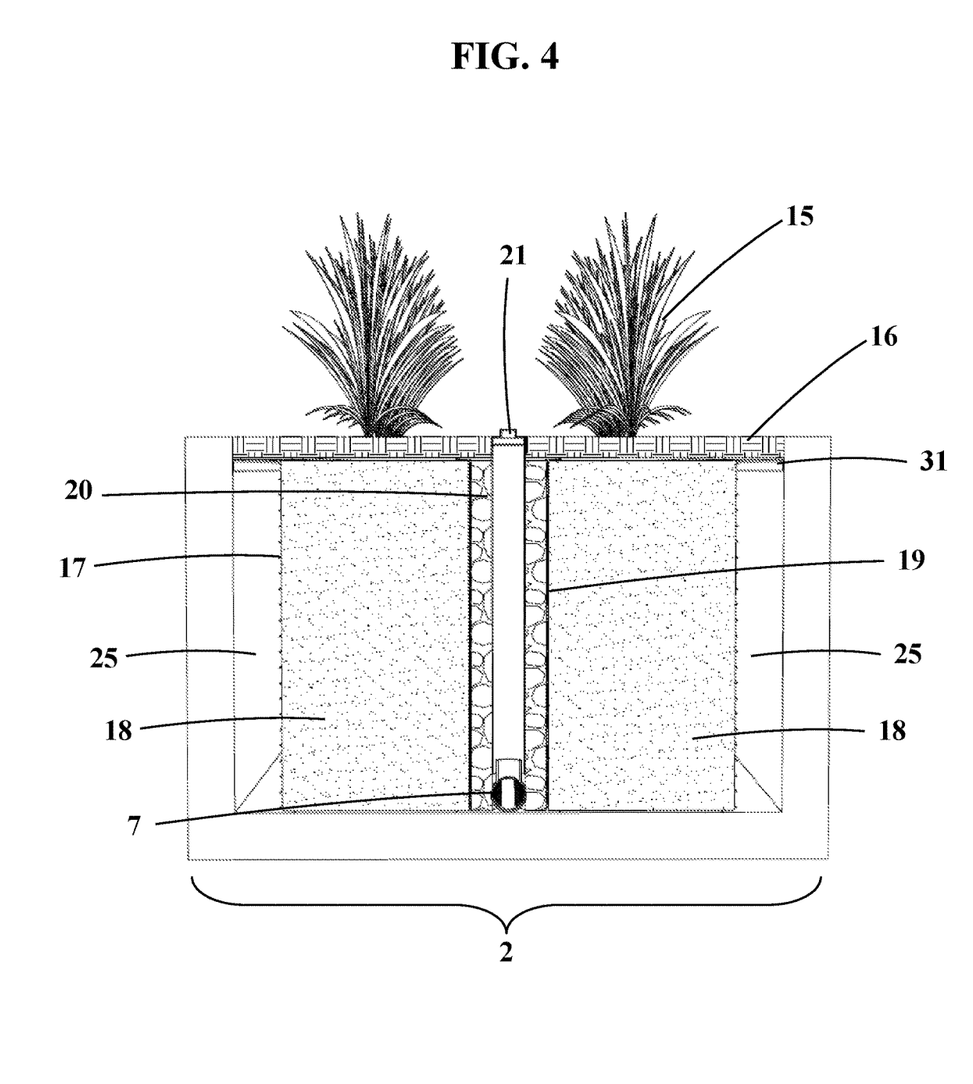
FIG. 4 is a side elevational section view of an embodiment of the horizontal flow wetland biofilter system highlighting preferred embodiments of filtration media and separation elements.

FIG. 4 is a side elevational view of the biofilter wetland chamber 2 and highlights various filtration media and elements of the preferred embodiment. These include above ground mulch 16 and vegetation 15 with the underdrain cleanout riser 21 with it's opening above ground to allow for access for cleaning. The underdrain cleanout riser 21 is connected to the outlet pipe/opening 7 within the biofilter wetland chamber 2. The rock underdrain cell 20 is encased by the biofilter media cage outlet side 19 which also separates the bioretention media 18. The biofilter media cage inlet side 17 and biofilter media cage outlet side 19 separate the bioretention media 18 from the biofilter chamber inlet void area 25 with a removable cover 31.

Figure 5:
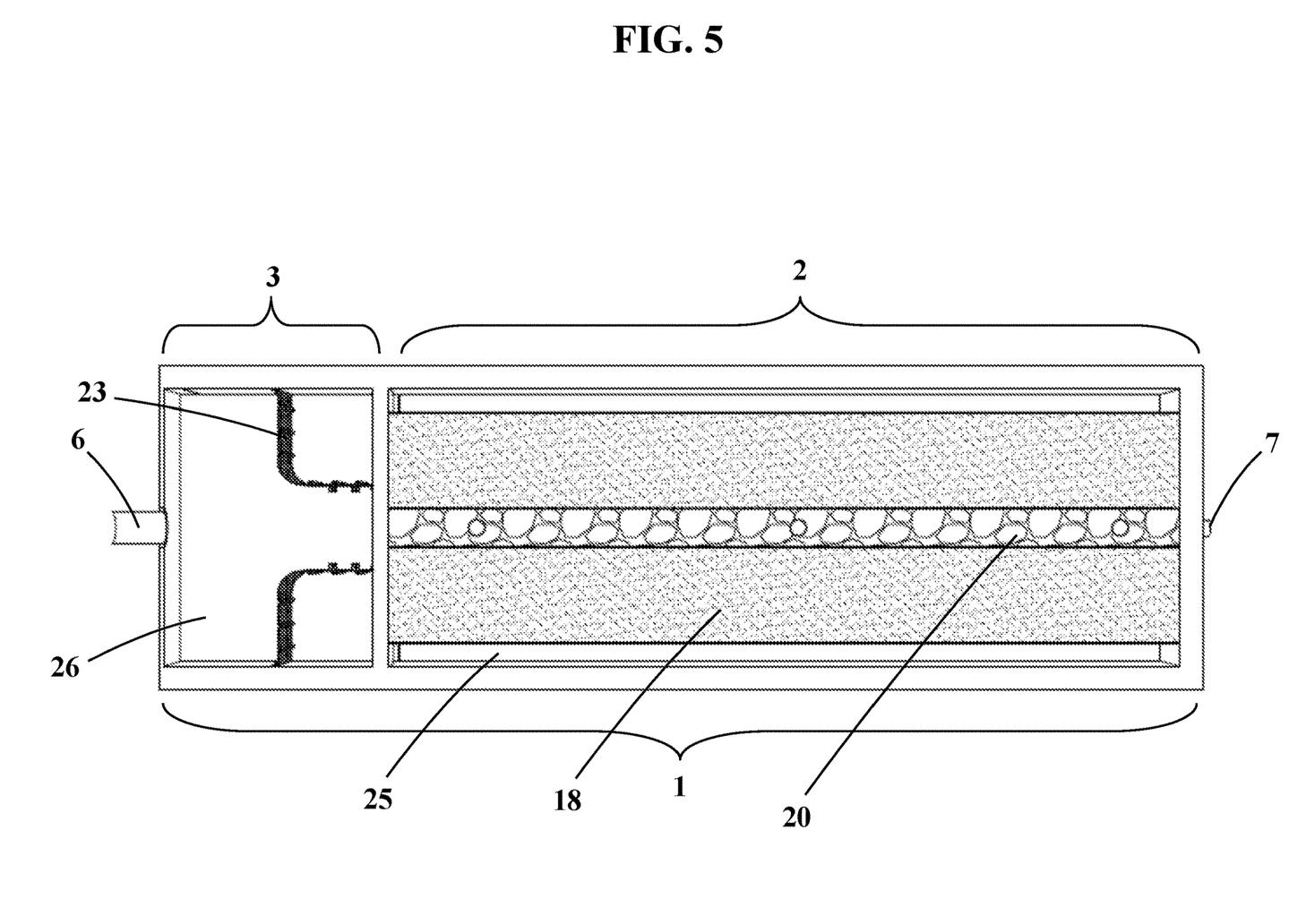
FIG. 5 is a top plan view of an embodiment of the horizontal flow wetland biofilter system.

FIG. 5 is a top plan view of the pre-filter chamber 3 and the biofilter wetland chamber 2 of the wetland biofilter system 1. Both the inlet pipe/opening 6 and the outlet pipe/opening 7 define the ends of the system. Also show is the pre-treatment chamber floor 26 and the top of the trash pre-filter screen 23. The biofilter chamber inlet void area 25 and the bioretention media 18 and rock underdrain cell 20 are also depicted.

Figure 6:
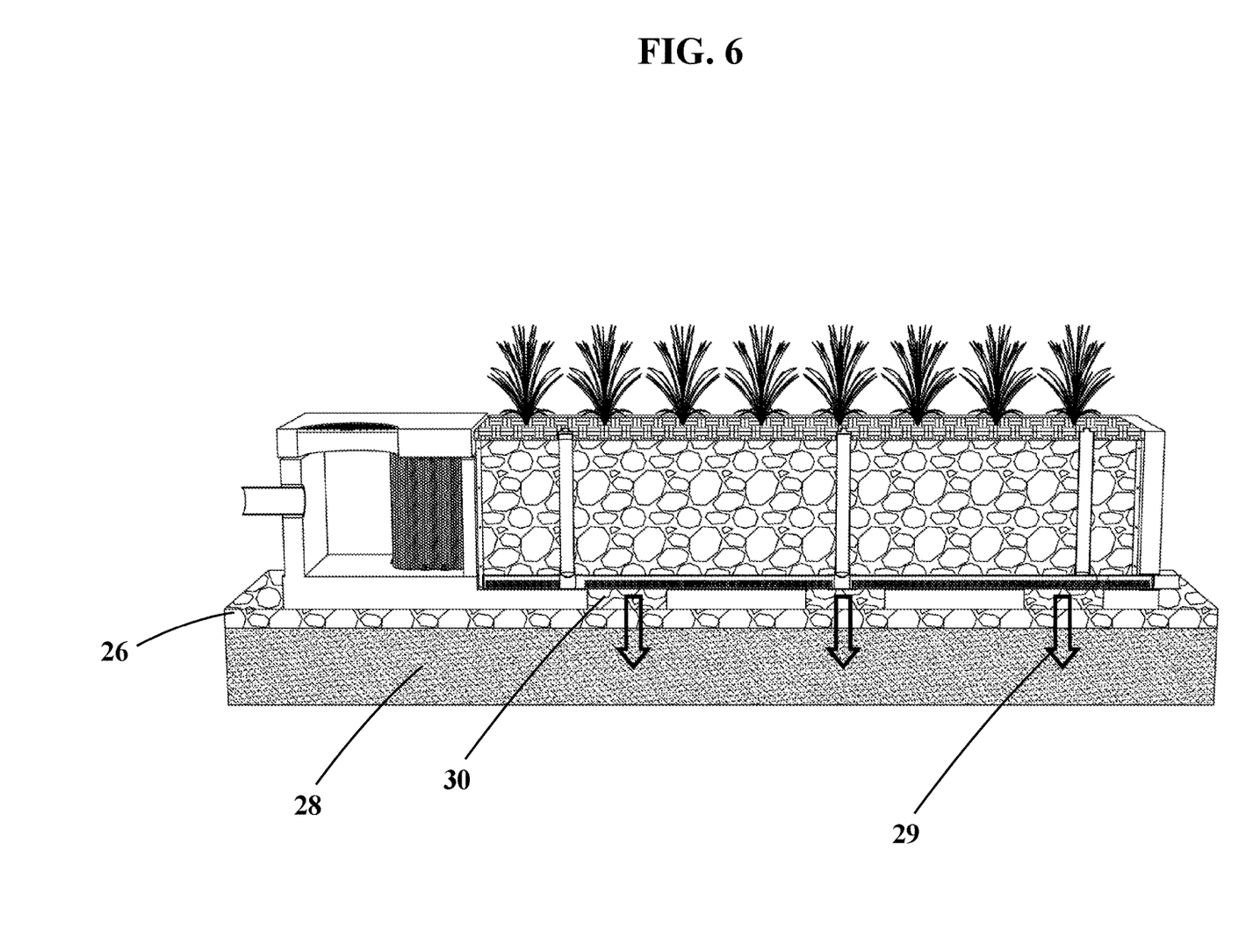
FIG. 6 a side elevational section view of the horizontal flow wetland biofilter system demonstrating the flow of infiltrated water from the system into external native soil.

FIG. 6 is a side elevational sectional view of the wetland biofilter system 1 and it highlights the infiltration of treated water 29 through the bioretention media 18 through the bottom openings 30 and the pre-treatment chamber floor 26 into the native soil 28.

Figure 7:
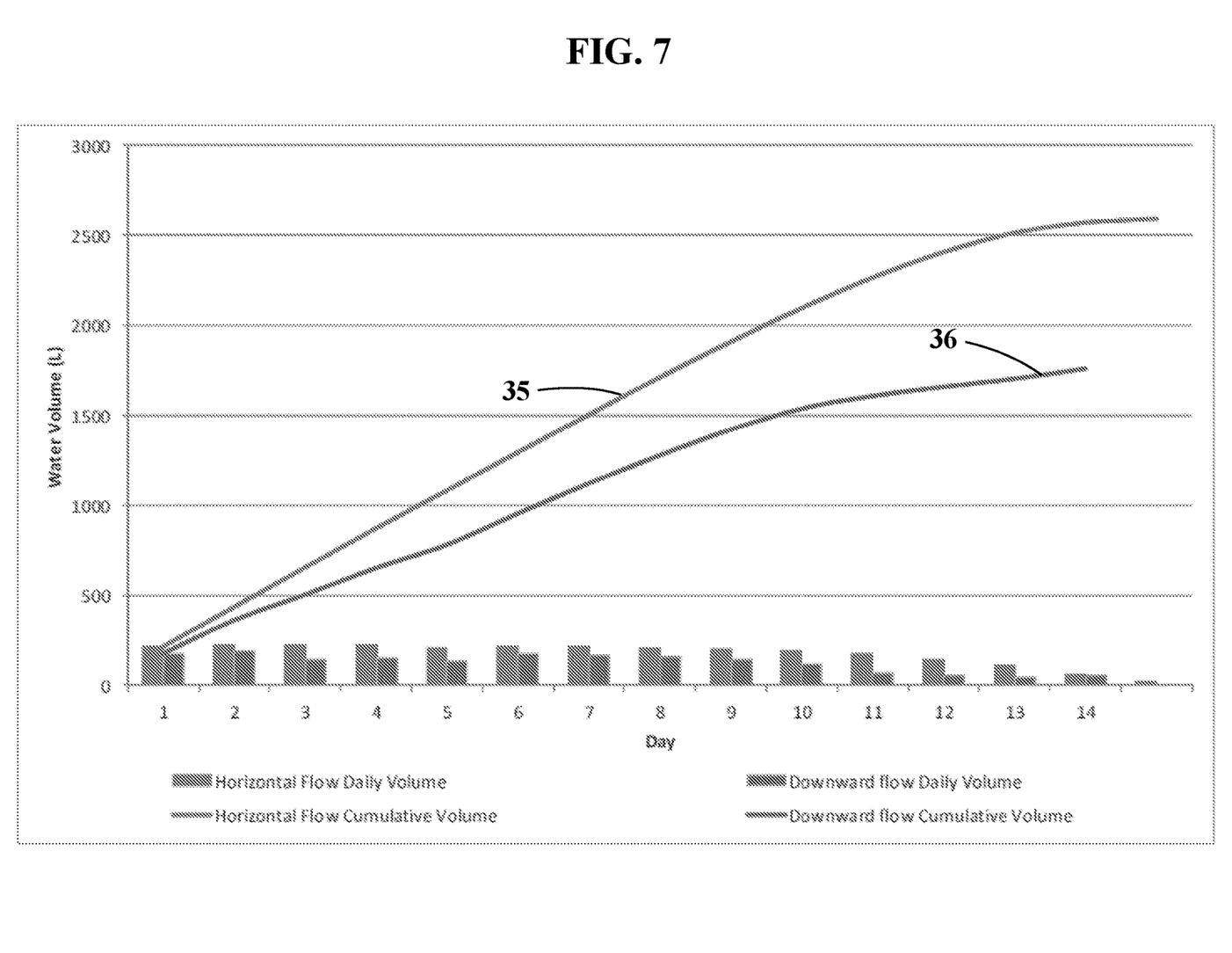
FIG. 7 is a chart demonstrating water volume of both horizontal and downward values.

FIG. 7 is an independent third-party data plot demonstrating water volume of both horizontal values 35 and downward values 36. The graph measures several factors including: horizontal flow daily volume, horizontal flow cumulative volume, downward flow daily volume, and downward flow cumulative volume.

Figure 8:
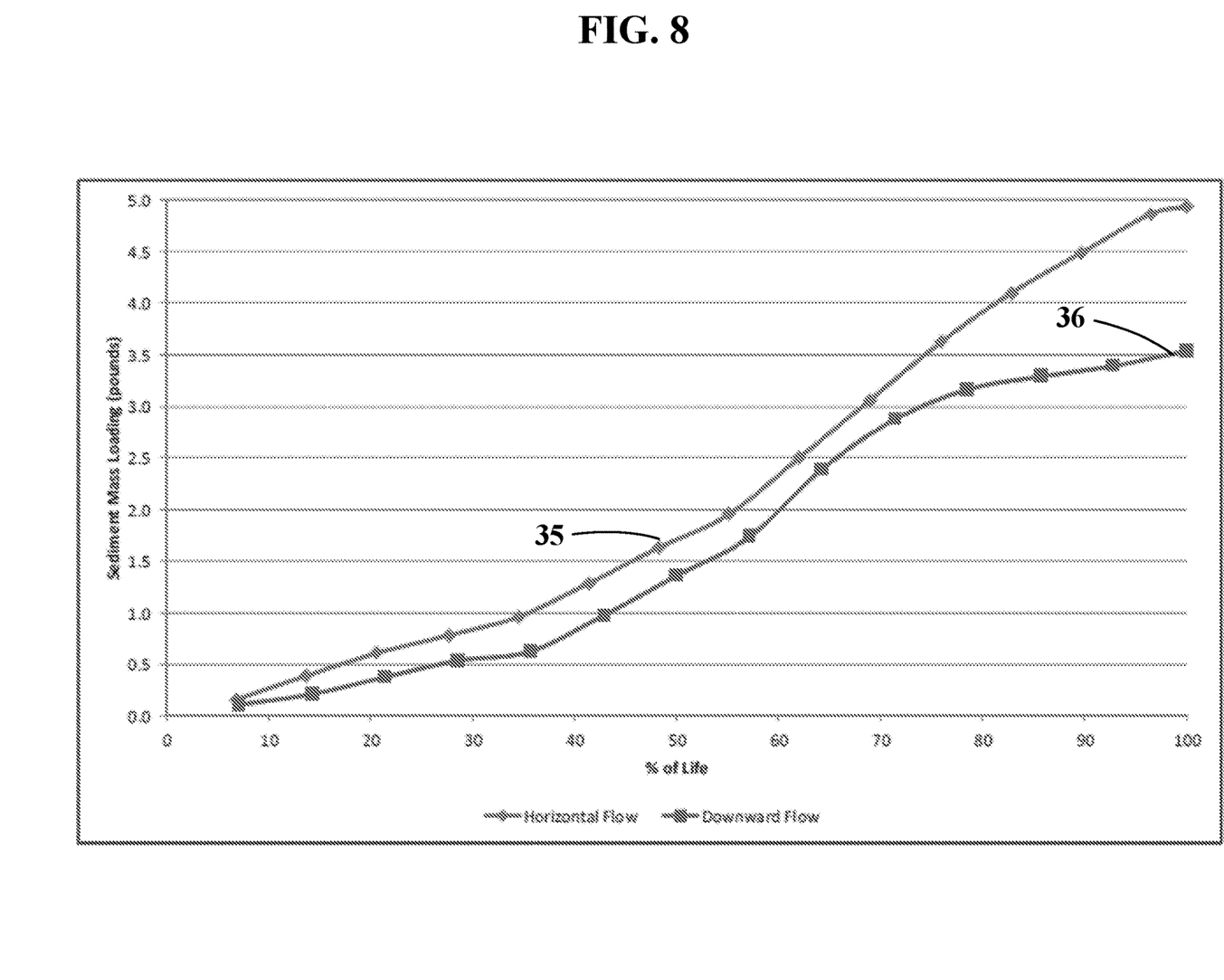
FIG. 8 is a chart demonstrating sediment mass loading of both horizontal and downward values.

FIG. 8 is another independent third-party data plot demonstrating sediment mass loading of both horizontal values 35 and downward values 36.

We claim:

1. A dual-chamber wetland biofilter comprising:
   a first chamber with a filtration screen system including a filter screen which receives an influent;
   a second chamber with a media filtration bed, wherein the second chamber is in communication with the first chamber via two openings on each side of an end of the second chamber to receive a filtered influent from the first chamber and further filter the influent to produce an effluent, and
   wherein the first chamber and second chamber are arranged laterally with respect to each other;
   wherein the first chamber has top with an access hatch and the second chamber is open to the atmosphere and contains live vegetation,
   wherein the water must pass through the filtration screen in the first chamber to enter second chamber, said second chamber having two void areas vertically on two side walls of the second chamber, said second chamber having a pervious wall opposite each of the side walls and spaced apart from the side walls to create the two void areas, each said pervious wall containing media on the side opposite the void area,
   wherein water from the void area passes through the pervious wall into the filter media and flows horizontally to the middle of the chamber which contains a rock material and perforated underdrain on the floor to direct water to an outside of the second said underdrain containing at least one orifice to limit the flow rate out of the chamber.

2. The dual-chamber wetland biofilter of claim 1, wherein the media filtration bed contains vegetation.

3. A method of filtering influent in a dual-chamber wetland biofilter, comprising:
   providing the dual-chamber wetland biofilter of claim 1,
   receiving an influent into the first chamber with the filtration screen system; filtering the influent through the filtration screen system;
   discharging the filtered influent to the second chamber with filtration system the media filtration bed which is arranged laterally with the first chamber;
   filtering the filtered influent through the media filtration bed to produce an effluent;
   collecting the effluent and discharging the effluent from the dual-chambered wetland biofilter to the outside.

4. A biofilter chamber comprising:
   two outer side walls defining a chamber;
   a first media filtration bed disposed within the chamber wherein the media filtration bed extends from a floor of the first chamber and is enclosed by two permeable inner side walls, each of the permeable inner side walls being separated from the outer side walls by a respective void area for receiving an influent;
   an outlet opening coupled to an outside of the chamber, the outlet opening connected to a perforated horizontal tube configured to receive the filtered influent from the first media filtration bed;
   said horizontal tube containing an orifice plate to control the flow rate out of the chamber.

5. The biofilter chamber of claim 4, wherein the first media filtration bed contains live plant material.

6. The biofilter chamber of claim 4, further comprising a removable permeable cover disposed over the void area.

7. The biofilter chamber of claim 4, further comprising a removable impermeable cover disposed over the void area.

8. The biofilter chamber of claim 4, wherein the first media filtration bed contains one or more granular filtration media composed of organic, inert, or sorptive substances that provide physical, chemical and biological filtration of contaminated fluid.

9. The biofilter chamber of claim 4, wherein the one or more outer side walls comprise an transfer opening into the void area.

* * * * *